(No Model.)
T. COLDWELL.
CLUTCH OPERATING MECHANISM FOR LAWN MOWERS.
No. 504,330. Patented Sept. 5, 1893.
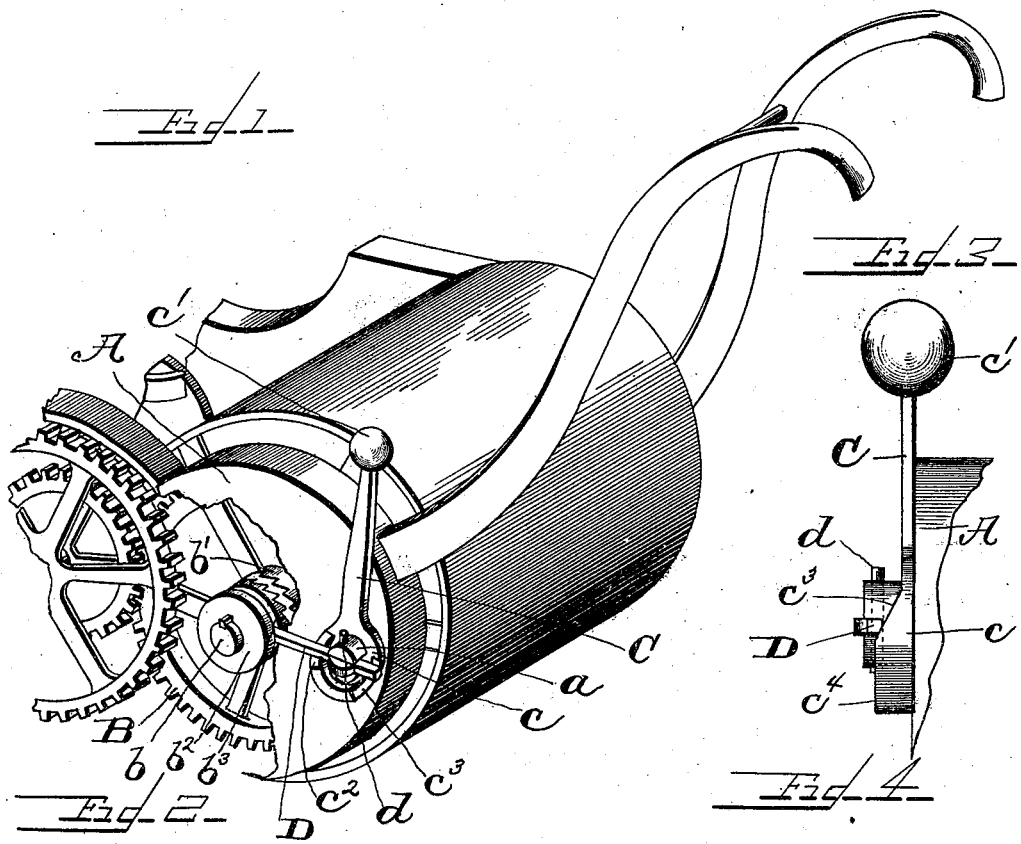
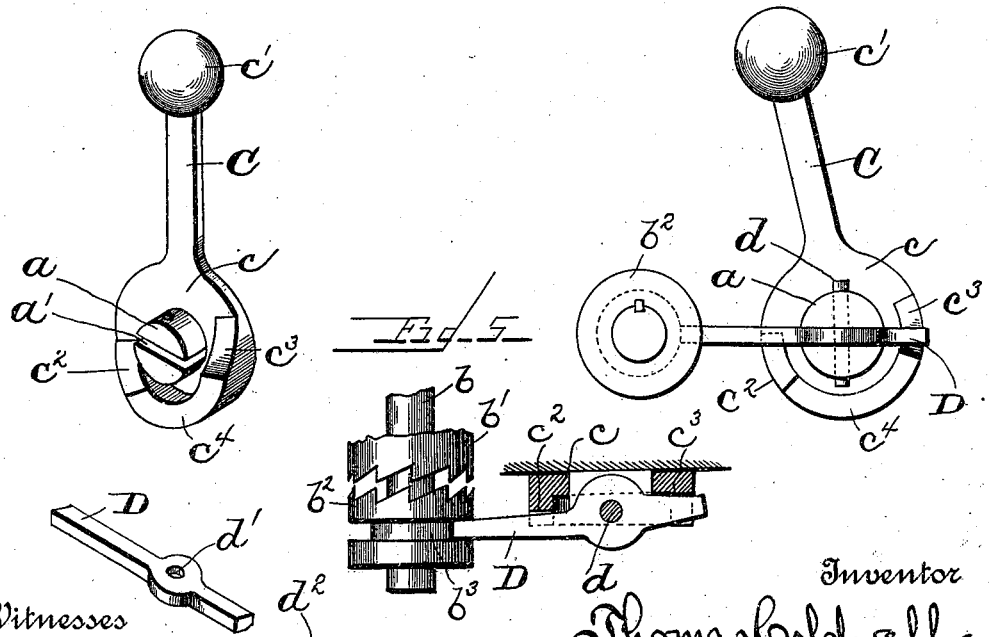
Witnesses
G. A. Vauberschmidt
Jessie D. Kingsbury
Inventor
Thomas Coldwell
By Whitaker & Prevost
Attorneys

UNITED STATES PATENT OFFICE.

THOMAS COLDWELL, OF NEWBURG, NEW YORK.

CLUTCH-OPERATING MECHANISM FOR LAWN-MOWERS.

SPECIFICATION forming part of Letters Patent No. 504,330, dated September 5, 1893.

Application filed December 21, 1892. Serial No. 455,923. (No model.)

*To all whom it may concern:*

Be it known that I, THOMAS COLDWELL, a citizen of the United States, residing at Newburg, in the county of Orange and State of New York, have invented certain new and useful Improvements in Clutch-Operating Mechanism for Lawn-Mowers; and I do hereby declare the following to be a full, clear, and exact description of the invention, such as will enable others skilled in the art to which it appertains to make and use the same.

My invention is an improvement in clutch operating mechanisms for lawn mowers and consists in the novel features of construction and combination of parts hereinafter fully described reference being had to the accompanying drawings which illustrate one form in which I have contemplated embodying my invention and said invention is fully disclosed in the following description and claims.

In the said drawings, Figure 1 is a perspective view of the rear portion of a lawn mower showing my invention applied thereto a part of the machine casing being broken away. Fig. 2 shows the parts of my improved clutch operating mechanism in detail. Fig. 3 is a view of said parts from the rear of the lawn mower showing the casing broken away. Fig. 4 is a side elevation of the same. Fig. 5 is a top plan view of the same.

Referring to the said drawings A represents the casing of the driving pinion of a lawn mower and B the driving pinion mounted loosely upon the shaft $b$, and provided with a clutch member $b'$. $b^2$ is the other clutch member secured on said shaft by a spline or feather in the usual manner, and provided in this instance with an annular groove $b^3$ to receive the clutch operating devices.

Upon some fixed portion of the machine frame, as the casing A is a rigid pin or stud $a$ upon which is pivotally mounted a disk $c$ to which is secured the weighted lever C having a weight $c'$ at its outer end. The pin or stud $a$ is provided with a recess $a'$ in which is mounted the clutch operating lever D pivoted adjacent to its center by a pin $d$ passing through the stud $a$, the lever D being preferably enlarged and provided with an aperture $d'$ to receive said pin. The disk $c$ is provided with a pair of inclined or curved cam surfaces $c^2$ $c^3$ extending outwardly from the face of the disk and having their highest points united in this instance by a plain or flat surface $c^4$ parallel with the face of the disk. These cam surfaces are adapted to engage portions of the lever D at either side of its point of pivoting preferably beveled as shown in the drawings, and the forward end of the lever D operatively engages the movable clutch member in this instance by engaging the annular groove $b^3$.

The operation of the clutch operating mechanism is as follows: When the weighted lever is moved forward of a perpendicular position it will fall of its own weight and the cam surface or grade $c^3$ will engage the lever D in rear of its point of pivoting and force it outward thereby forcing the clutch member $b^2$ into engagement with the driving wheel. The cam grade is of such length that the clutch will be forced into engagement with the driving wheel before the highest part of the grade engages the lever D so that the weight of the lever C holds the parts locked rigidly in operative position and the jolting of the machine only tends to lock the parts more tightly. When the weighted lever is moved rearwardly past the perpendicular, it will fall and bring the cam $c^2$ into engagement with the lever D and thus disengage the clutch members and lock the parts in this position. I prefer to bevel the parts of the lever D which engage the cams $c^2$ and $c^3$ as shown at $d^2$ as the cams can be more readily disengaged from the lever than they could if they engaged a sharp corner.

I do not desire to limit myself to the exact details of construction herein shown and described as variations may be made therein without departing from the spirit of my invention.

What I claim, and desire to secure by Letters Patent, is—

1. In a clutch mechanism the combination with the movable clutch member, of an actuating lever therefor operatively connected therewith and a weighted lever having cams for engaging and moving the actuating lever at right angles to the plane of movement of the said weighted lever, whereby the actuating lever is locked by the weighted lever, substantially as described.

2. In a clutch operating mechanism the combination with the movable clutch member, of an operating lever pivoted intermediate its ends and operatively connected therewith, and a lever provided with cam grades for engaging portions of said operating lever on opposite sides of its point of pivoting and having a weight for holding one of said grades in engagement with the operating lever, substantially as described.

3. In a clutch operating mechanism the combination with the movable clutch member, of a weighted lever pivoted upon a stationary stud, and provided adjacent thereto with cam grades, an operating lever operatively connected with said movable clutch member and pivoted intermediate its ends to said stud and having portions at each side of its pivot adapted to be engaged by said cam grades, substantially as described.

In testimony whereof I affix my signature in presence of two witnesses.

THOS. COLDWELL.

Witnesses:
HOWARD THORNTON,
L. W. Y. McCROSKERY.